United States Patent
Nam

(10) Patent No.: US 8,153,190 B2
(45) Date of Patent: Apr. 10, 2012

(54) PATTERNED MAGNETIC RECORDING MEDIUM AND METHOD OF MANUFACTURING THE SAME

(75) Inventor: Yun-woo Nam, Gyeonggi-do (KR)

(73) Assignee: Samsung Electronics Co., Ltd., Suwon-Si, Gyeonggi-Do (KR)

(*) Notice: Subject to any disclaimer, the term of this patent is extended or adjusted under 35 U.S.C. 154(b) by 311 days.

(21) Appl. No.: 12/275,703

(22) Filed: Nov. 21, 2008

(65) Prior Publication Data

US 2009/0071935 A1    Mar. 19, 2009

Related U.S. Application Data

(62) Division of application No. 10/885,872, filed on Jul. 8, 2004, now abandoned.

(30) Foreign Application Priority Data

Jul. 19, 2003 (KR) .......... 10-2003-0049550

(51) Int. Cl.
- *G11B 5/33* (2006.01)
- *G11B 5/00* (2006.01)
- *B44C 1/22* (2006.01)

(52) U.S. Cl. ........... 427/128; 427/127; 427/130; 216/22
(58) Field of Classification Search .............. 216/22; 427/130, 127, 128
See application file for complete search history.

(56) References Cited

U.S. PATENT DOCUMENTS

| | | | |
|---|---|---|---|
| 5,820,769 A | 10/1998 | Chou | |
| 6,001,467 A * | 12/1999 | Ohta et al. | 428/822.3 |
| 6,014,296 A | 1/2000 | Ichihara et al. | |
| 6,313,969 B1 * | 11/2001 | Hattori et al. | 360/135 |
| 6,579,634 B2 | 6/2003 | Saito | |
| 6,682,833 B1 * | 1/2004 | Mukai | 428/831.1 |
| 6,977,108 B2 | 12/2005 | Hieda et al. | |
| 7,169,488 B2 | 1/2007 | Chen et al. | |
| 7,189,435 B2 | 3/2007 | Tuominen et al. | |
| 2002/0055239 A1 * | 5/2002 | Tuominen et al. | 438/466 |
| 2002/0068195 A1 | 6/2002 | Lundstrom | |
| 2002/0086185 A1 * | 7/2002 | Yasui et al. | 428/694 TS |
| 2002/0154440 A1 | 10/2002 | Bonin et al. | |

(Continued)

FOREIGN PATENT DOCUMENTS

JP    55-157129    12/1980

(Continued)

OTHER PUBLICATIONS

Korean Office Action dated Jul. 29, 2005.

(Continued)

*Primary Examiner* — Timothy Meeks
*Assistant Examiner* — Mandy Louie
(74) *Attorney, Agent, or Firm* — Buchanan Ingersoll & Rooney PC

(57) ABSTRACT

Provided are a patterned magnetic recording medium which has an extremely planarized surface and a method of manufacturing the same. The medium includes a patterned magnetic layer including a plurality of magnetic columns that are arranged with a predetermined pitch therebetween; a substrate that supports the patterned magnetic layer; and a boundary layer, which is filled in gaps between the magnetic columns of the patterned magnetic layer. Thus, an air bearing due to stable airflow is created over the magnetic layer, and magnetic recording/reproduction are easily achieved at ultra-high density.

10 Claims, 5 Drawing Sheets

U.S. PATENT DOCUMENTS

| | | | |
|---|---|---|---|
| 2003/0072971 A1* | 4/2003 | Fukutani et al. | 428/694 IS |
| 2004/0029296 A1* | 2/2004 | Tuttle | 438/3 |
| 2004/0166372 A1* | 8/2004 | Haginoya et al. | 428/694 T |

FOREIGN PATENT DOCUMENTS

| | | |
|---|---|---|
| JP | 63-108535 | 5/1988 |
| JP | 11-296845 | 10/1999 |
| JP | 2000-298892 | 10/2000 |
| JP | 2000-315785 | 11/2000 |
| JP | 2001-067637 A | 3/2001 |
| JP | 2001-167431 A | 6/2001 |
| JP | 2001-176049 | 6/2001 |
| JP | 2001-325721 A | 11/2001 |
| JP | 2002-25030 | 1/2002 |
| JP | 2002-346999 A | 4/2002 |
| JP | 2003-178431 | 6/2003 |

OTHER PUBLICATIONS

Office Action issued by the Chinese Patent Office on Aug. 25, 2006 in corresponding Chinese Patent Application No. 200410071321.7, and English translation thereof.

Office Action issued by the Japanese Patent Office on Oct. 18, 2006 in corresponding Japanese Patent Application No. 2004-206618.

Office Action issued by Chinese Office Action dated Mar. 2, 2007 and English translation.

* cited by examiner

PATTERNED MAGNETIC RECORDING MEDIUM AND METHOD OF MANUFACTURING THE SAME

This application claims the priority of Korean Patent Application No. 2003-49550, filed on Jul. 19, 2003, in the Korean Intellectual Property Office, the disclosure of which is incorporated herein in its entirety by reference.

BACKGROUND OF THE INVENTION

1. Field of the Invention

The present invention relates to a patterned magnetic recording medium and a method of manufacturing the same, and more particularly, to a planarized patterned magnetic recording medium and a method of manufacturing the same.

2. Description of the Related Art

When a magnetic grain size is reduced to less than a certain critical value, a magnetic recording medium that employs a typical bulk magnetic layer reveals a superparamagnetic effect. The superparamagnetic effect reduces the number of bits per area, i.e., the recording density. Thus, to improve the recording density by suppressing the superparamagnetic effect, there is provided a patterned medium on which magnetic grains are structurally isolated from one another. U.S. patent applications Ser. No. 2002/0068195 A1 and No. 2002/0154440 A1 disclose such a patterned medium. In comparison with a conventional magnetic recording medium using a bulk magnetic layer, such a patterned medium leads to a much higher recording density of approximately 1000 Gbit per inch square or more.

FIG. 1 is an exploded view of a conventional patterned magnetic recording medium. The patterned magnetic recording medium is in the form of a disk that is rotated by a spindle motor, but FIG. 1 illustrates only an exploded portion thereof.

Referring to FIG. 1, a soft magnetic under layer 11 is disposed on the surface of a substrate 10 formed of glass or aluminum or a platter, and a buffer layer 12 is disposed on the soft magnetic under layer 11. A patterned magnetic layer 13 is then disposed on the buffer layer 12.

The patterned magnetic layer 13 includes a plurality of magnetic columns 13a, which are regularly aligned with a pitch of 0.2 nm and have a height of approximately several to several tens of nm. Thus, air gaps are formed in spaces between the magnetic columns 13a.

In such a circumference, if a relative movement between the medium and a slider 14 on which magnetic recording/reading heads are mounted occurs as illustrated in FIG. 2, an air bearing 15 is created between the slider 14 and the patterned magnetic layer 13. At this time, air flows through the air gaps between the magnetic columns 13a below the air bearing 15. Thus, the pressure of the air bearing 15, which is applied between the slider 14 and the patterned magnetic layer 13, is reduced due to air turbulence.

As the pressure of the air bearing 15 is reduced and becomes unstable, the slider 14 using a swing arm cannot stably swing over the patterned magnetic layer 13 and, above all, the slider 14 collides with the patterned magnetic layer 13, thereby causing defects to the magnetic layer 13.

SUMMARY OF THE INVENTION

The certain exemplary embodiments of the present invention provides a patterned magnetic recording medium which can product a stable air bearing and a method of manufacturing the same. thus, a slider can stably fly over a magnetic layer owing to the stable air bearing, and collision of the slider with the magnetic layer can be prevented.

Also, certain exemplary embodiments of the present invention provides a patterned magnetic recording medium in which a boundary layer formed of a nonmagnetic insulator is disposed between patterned magnetic columns to thereby reduce noise interferences between bits comprised in the patterned columns and a method of manufacturing the same.

According to an aspect of certain exemplary embodiments of the present invention, there is provided a patterned magnetic recording medium comprising a patterned magnetic layer including a plurality of magnetic columns that are arranged with a predetermined pitch; a substrate, which supports the patterned magnetic layer; and a boundary layer, which is filled in gaps between the magnetic columns of the patterned magnetic layer.

A buffer layer may be disposed between the patterned magnetic layer and the substrate.

A soft magnetic under layer may be disposed between the buffer layer and the substrate.

According to another aspect of certain exemplary embodiments of the present invention, there is provided a method of manufacturing a patterned magnetic recording medium. The method includes preparing a substrate; forming a boundary layer on the substrate, the boundary layer having wells that are arranged with a predetermined pitch; filling the wells with a magnetic material layer by coating the magnetic material layer on the boundary layer; and planarizing the boundary layer and a magnetic layer including magnetic columns filled in the wells of the boundary layer.

When the substrate is prepared, a soft magnetic under layer and a buffer layer may be formed on the substrate.

To form the boundary layer, a nonmagnetic material may be coated on the substrate to a predetermined thickness, and a boundary layer having wells may be formed by patterning the nonmagnetic material in a predetermined pattern.

The coating of the magnetic material layer may comprise annealing the coated magnetic material layer at a predetermined temperature. The barrier layer and the magnetic layer may be planarized using plasma etching.

The boundary layer may be formed of one of silicon oxide ($SiO_2$) and silicon nitride ($Si_3N_4$), which are dielectric materials, using chemical vapor deposition (CVD) or physical vapor deposition (PVD), for example, plasma-enhanced chemical vapor deposition (PECVD) or plasma sputtering.

Also, the magnetic material layer may be formed of tetracyanoethanide (TCNE)-based magnetic polymer using spin coating or CVD. The magnetic material layer may be annealed at a temperature ranging from 100 to 300° C. Thus, the magnetic material layer is reflowed and densified and voids in the wells are completely removed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
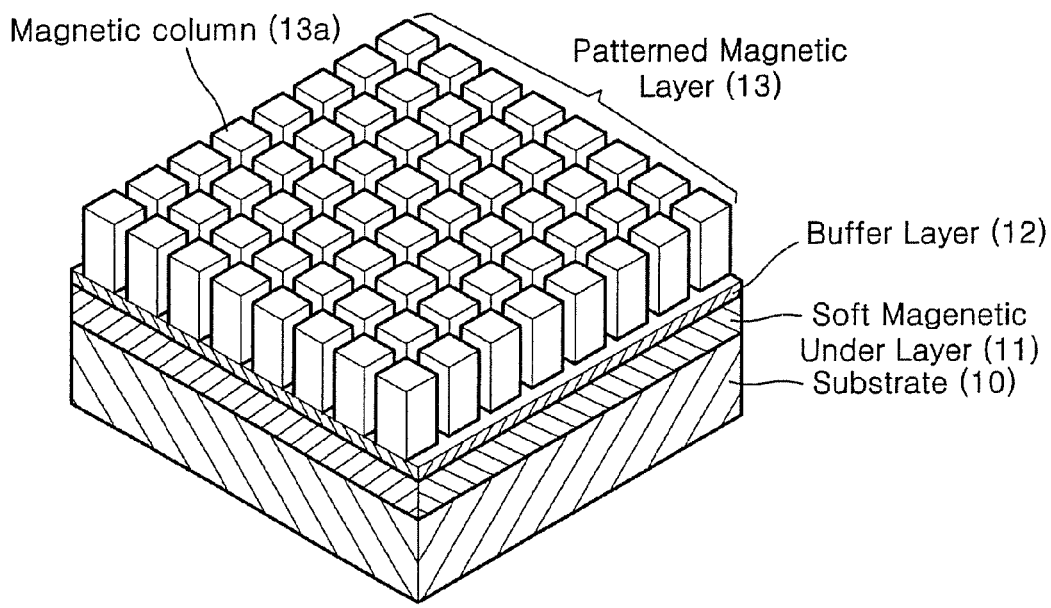
FIG. 1 is an exploded view of a conventional patterned magnetic recording medium.
Figure 2:
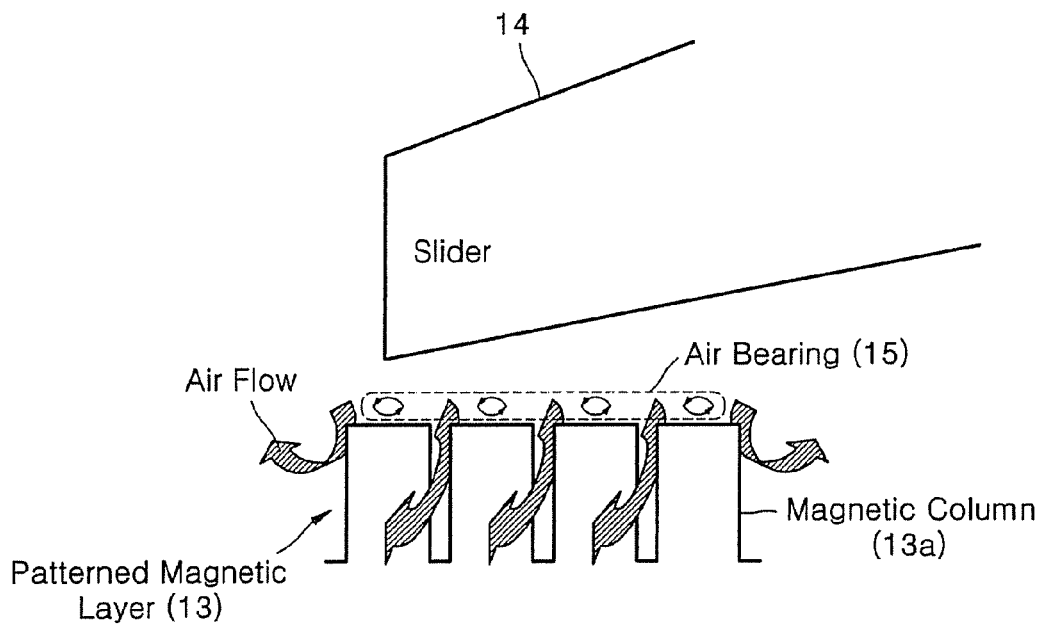
FIG. 2 illustrates a relationship between an air bearing that is produced over the conventional magnetic recording medium of FIG. 1 and a slider.
Figure 3:
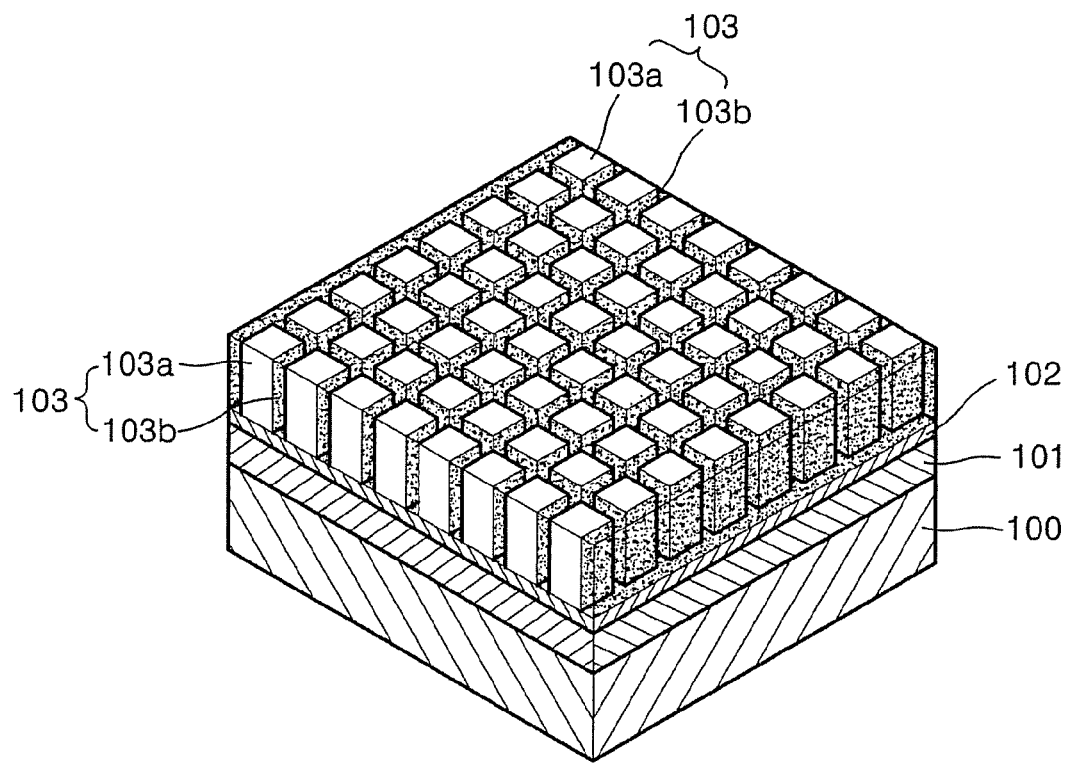
FIG. 3 is an exploded view of a patterned magnetic recording medium according to the present invention.

FIG. 3 is an exploded view of a patterned magnetic recording medium including a planarized magnetic recording layer, according to the present invention.

Referring to FIG. 3, a soft magnetic under layer 101 is disposed on a substrate 100 formed of glass or aluminum or a platter, and a buffer layer 102 is disposed on the soft magnetic under layer 101. On top of the buffer layer 102, a patterned magnetic layer 103 is disposed. The magnetic layer 103 includes a patterned boundary layer 103b, which is patterned in gratings, and patterned magnetic columns 103a, which are filled in a plurality of wells formed in the patterned boundary layer 103b.

Figure 4:
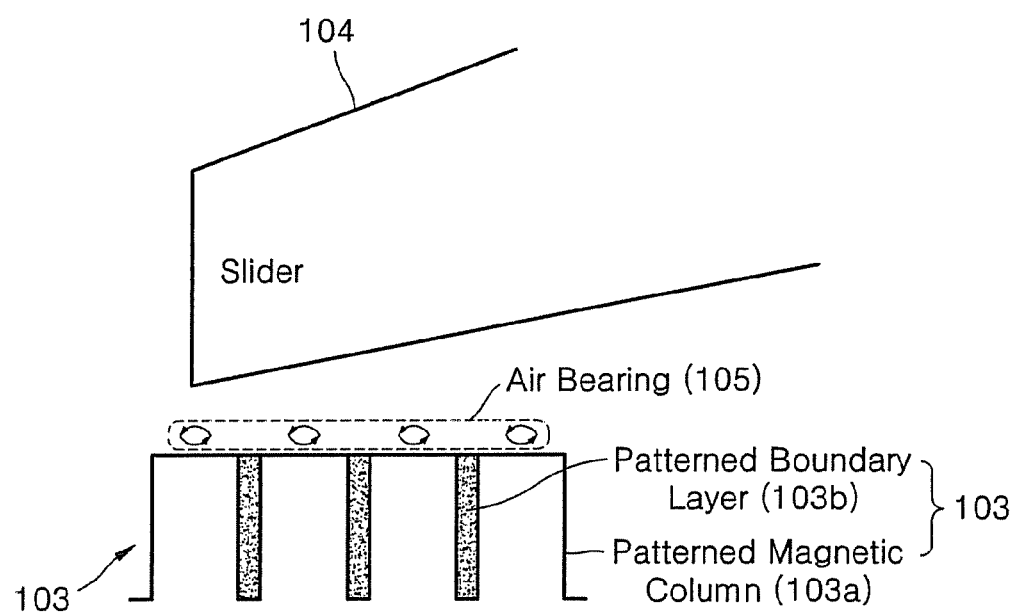
FIG. 4 illustrates a relationship between an air bearing that is produced over the surface of the patterned magnetic recording medium of FIG. 3 and a slider flying over the patterned magnetic recording medium.

Since the patterned magnetic layer 103 has no air gaps between the magnetic columns 103a, air turbulence or pressure reduction due to airflow does not occur. As a result, a stable air bearing 105 is produced between a slider 104 and the patterned magnetic layer 103, as illustrated in FIG. 4.

This stable air bearing 104 allows the slider 104 to stably fly over the magnetic layer 103 and prevents collision or friction between the slider 104 and the magnetic layer 103.

In addition, the boundary layer 103 formed of a nonmagnetic insulator, which is disposed between the magnetic columns 103a, can reduce noise interferences between respective bits comprised in the magnetic columns 103a.

To realize a high data recording density of approximately 1000 Gb/in$^2$, the size of each of the wells formed in the boundary layer 103b, i.e., the area of each of the magnetic columns 103a, should be approximately 25 nm, and the thickness of the boundary layer 103b, i.e., the pitch between the wells, should be limited to approximately several nm. These conditions can be satisfied using nanolithographic technology.

Hereinafter, a method of manufacturing a patterned magnetic recording medium according to an embodiment of the present invention will be described with reference to FIGS. 5A through 5G.

Figure 5A:
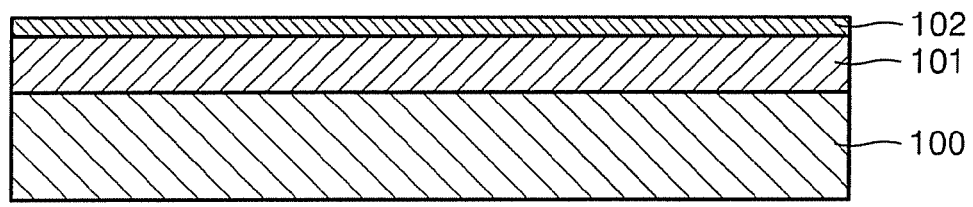
FIGS. 5A through 5H are cross-sectional views illustrating a method of manufacturing the patterned magnetic recording medium of FIG. 3.

Referring to FIG. 5A, a substrate 100 on which a soft magnetic under layer 101 and a buffer layer 102 are formed is prepared.

Figure 5B:
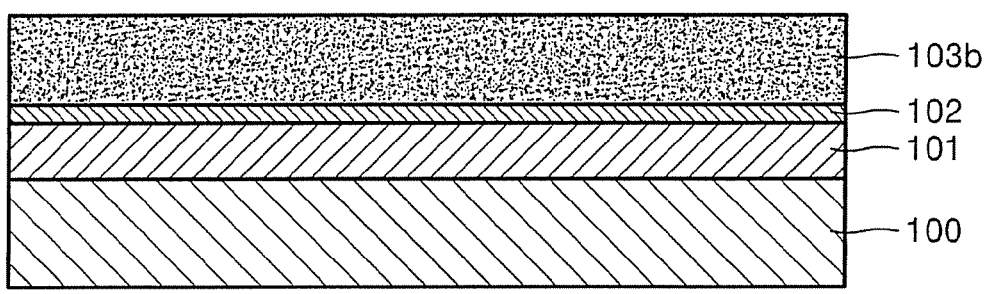

Referring to FIG. 5B, a material layer 103b for forming a magnetic barrier layer is formed on the buffer layer 102 using plasma-enhanced chemical vapor deposition (PECVD) or sputtering.

Figure 5C:
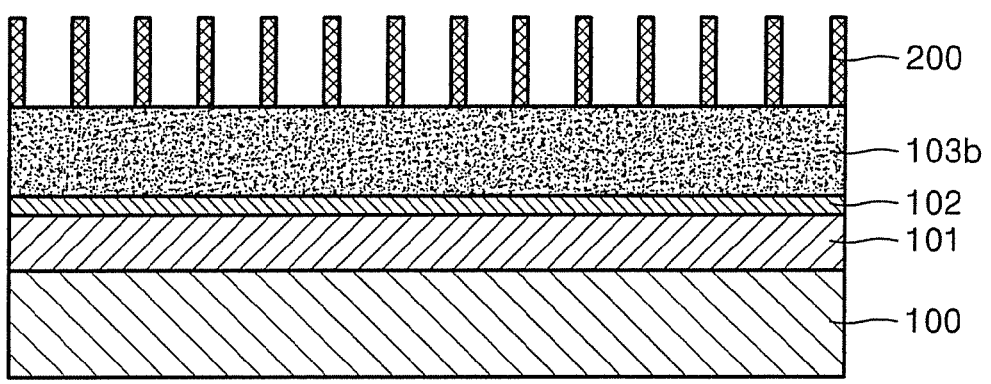

Referring to FIG. 5C, a photoresist mask 200 is formed on the material layer 103b for forming the magnetic barrier layer. To realize a subsequent nanometer patterning process, the photoresist mask 200 is formed using a nanolithgraphic technique, such as electronic beam lithography, X-ray lithography, deep ultraviolet (DUV) lithography, extreme ultraviolet (EUV) lithography, or nanoimprinting.

Figure 5D:
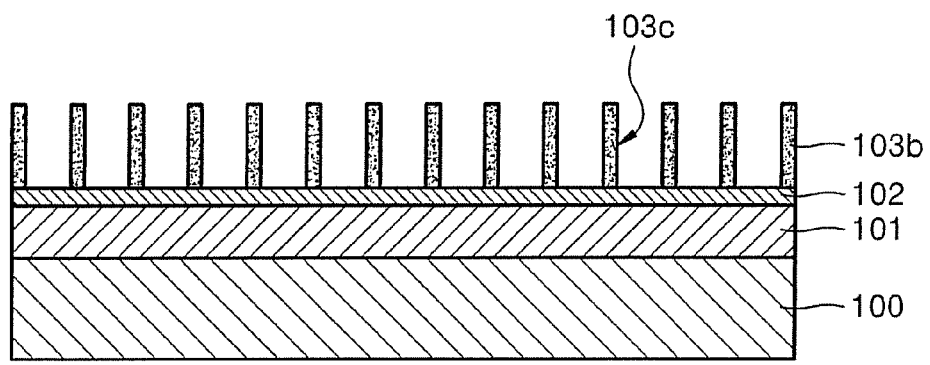

Referring to FIG. 5D, portions of the material layer 103 for forming the magnetic barrier layer, which are not covered by the photoresist mask 200, are etched using a reactive ion beam etch (RIE) process. Thus, wells 103c are formed in the material layer 103b for forming the barrier layer, and a desired barrier layer 103b is obtained. After the barrier layer 103b is formed, the photoresist mask 200 is removed by stripping.

Figure 5E:
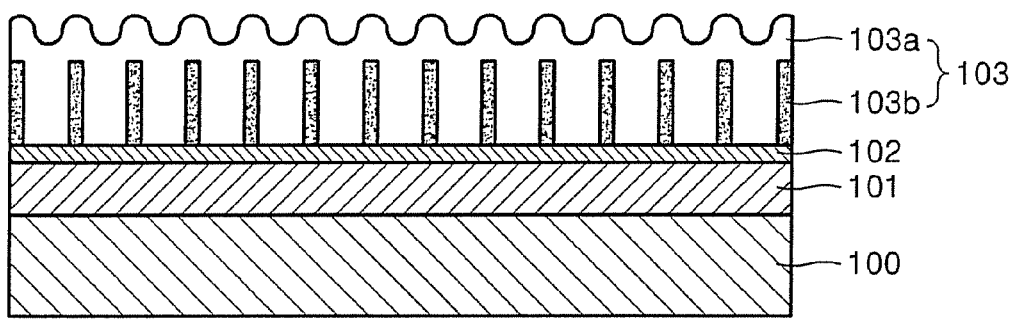

Referring to FIG. 5E, a magnetic material layer 103a formed of tetracyanoethanide (TCNE) is formed to a predetermined thickness on the barrier layer 103b. The magnetic material layer 103a is formed to completely fill the wells 103c and cover the barrier layer 103b.

Figure 5F:
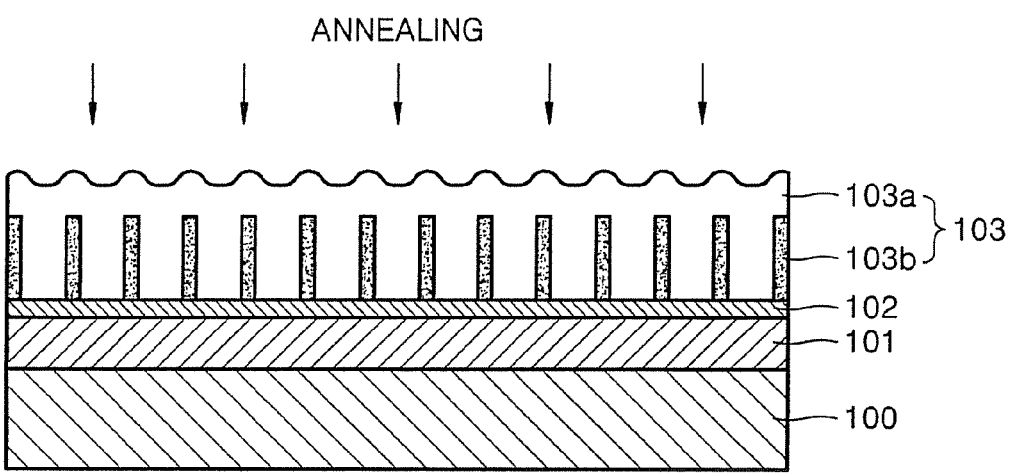

Referring to FIG. 5F, the magnetic material layer 103a is annealed at a temperature of approximately 100 to 300° C. to allow the magnetic material layer 103a to reflow. Thus, the material layer 103a is densified, voids are completely removed, and the surface of the material layer 103a is less flexural.

Figure 5G:
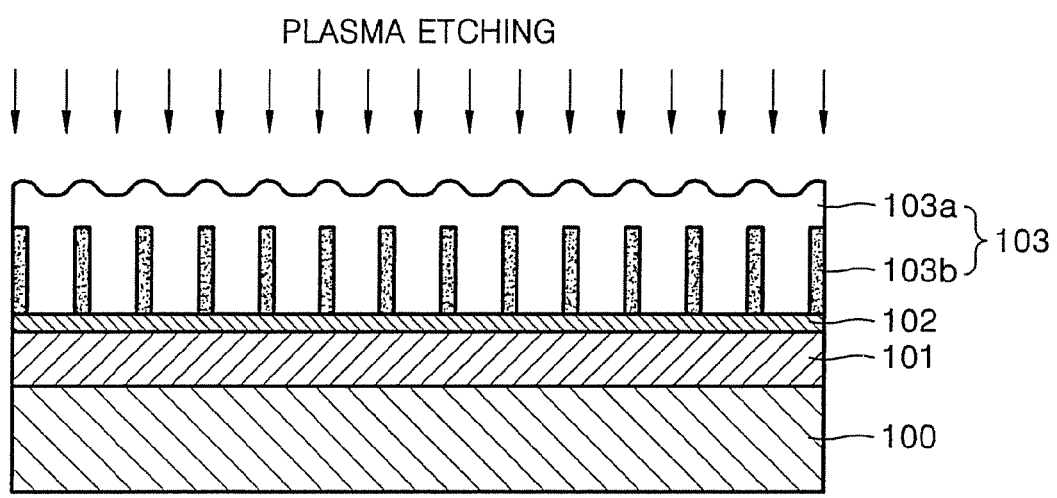
Figure 5H:
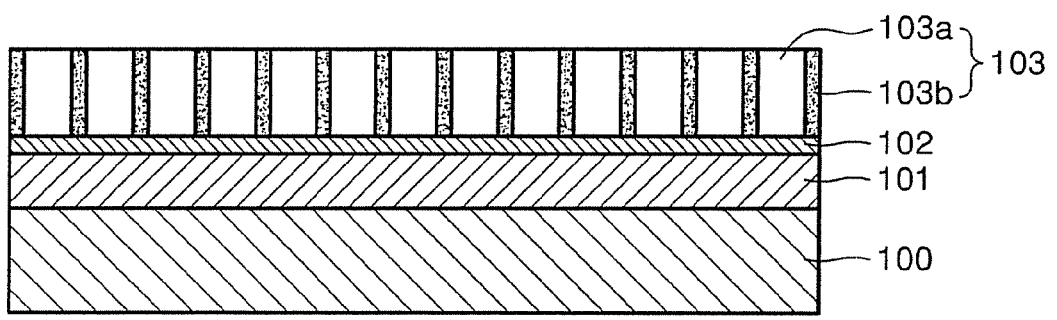

Referring to FIG. 5G, an etchback process, i.e., plasma etching, is performed on the entire surface of the magnetic material layer 103a. As a result, a planarized magnetic layer 103, which includes the barrier layer 103b and magnetic columns 103a that are filled in wells formed in the barrier layer 103b, is completed as shown in FIG. 5H.

In certain exemplary embodiments of the present invention, a polymer-based magnetic material is used instead of conventionally used metal- or ceramic-based magnetic materials. Here, magnetic polymer is used not only as a magnetic recording material but also as a material for planarizing a geometric structure. Accordingly, a desired patterned magnetic recording layer can be obtained using a process that is no more complicated than a process in the conventional case.

Meanwhile, since magnetic polymer is deposited using spin coating or chemical vapor deposition (CVD), which is processed very slowly, the barrier layer 103b with a very fine structure has a good step coverage characteristic. Also, the annealing process is performed so that the magnetic material layer 103a is reflowed and densified and the roughness of its surface is improved. As a result, a planarized recording layer with a roughness of 1 nm or less can be obtained. If a planarization process using an etch process is additionally performed, a recording layer with an extremely low roughness of 1 nm or less can be obtained.

As a stable air bearing is produced on the recording layer, the slider can fly over the recording layer while maintaining a very constant flying height.

As explained thus far, a recording layer that has a very planarized surface and allows a stable air bearing can be achieved. Thus, an ultrahigh recording density of 1000 Gb/in$^2$ can be ensured. Further, by using a boundary layer formed of a nonmagnetic insulator, which is disposed between patterned magnetic columns, noise interferences between bits can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a patterned magnetic recording medium, the method comprising:
    preparing a substrate, wherein the preparing of the substrate comprises forming a soft magnetic under layer and then a buffer layer on the substrate;
    forming a boundary layer on the buffer layer, the boundary layer having wells that are arranged with a predetermined pitch;
    filling the wells with a magnetic material layer by coating the magnetic material layer on the boundary layer; and planarizing the boundary layer and a magnetic layer including magnetic columns filled in the wells of the boundary layer, wherein the magnetic material layer is formed of tetracyanoethanide (TCNE)-based magnetic polymer.

2. The method of claim 1, wherein the forming of the boundary layer comprises:

coating a nonmagnetic material on the substrate to a predetermined thickness; and forming a boundary layer having wells by patterning the nonmagnetic material in a predetermined pattern.

3. The method of claim 1, wherein the coating of the magnetic material layer comprises annealing the coated magnetic material layer at a predetermined temperature.

4. The method of claim 2, wherein the coating of the magnetic material layer comprises annealing the coated magnetic material layer at a predetermined temperature.

5. The method of claim 1, wherein the planarizing of the barrier layer and the magnetic layer is performed using plasma etching.

6. The method of claim 1, wherein the boundary layer is formed of one of silicon oxide ($SiO_2$) and silicon nitride ($Si_3N_4$), which are dielectric materials.

7. The method of claim 2, wherein the boundary layer is formed of one of silicon oxide ($SiO_2$) and silicon nitride ($Si_3N_4$), which are dielectric materials.

8. The method of claim 2, wherein the boundary layer is formed using one selected from the group consisting of chemical vapor deposition, plasma-enhanced chemical vapor deposition, and physical vapor deposition.

9. The method of claim 1, wherein the magnetic material layer is formed using one of spin coating and chemical vapor deposition.

10. The method of claim 9, further comprising annealing the magnetic material layer at a temperature ranging from 100 to 300° C. to allow the magnetic material layer to reflow.

* * * * *